US012609579B2

(12) United States Patent
Tanaka

(10) Patent No.: US 12,609,579 B2
(45) Date of Patent: Apr. 21, 2026

(54) ROTATING ELECTRIC MACHINE

(71) Applicant: HONDA MOTOR CO., LTD., Tokyo (JP)

(72) Inventor: Shingo Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 18/482,946

(22) Filed: Oct. 9, 2023

(65) Prior Publication Data

US 2024/0128829 A1 Apr. 18, 2024

(30) Foreign Application Priority Data

Oct. 12, 2022 (JP) ................................. 2022-163835

(51) Int. Cl.
*H02K 5/20* (2006.01)
*H02K 9/19* (2006.01)
(52) U.S. Cl.
CPC .............. *H02K 5/203* (2021.01); *H02K 9/19* (2013.01)
(58) Field of Classification Search
CPC .................................. H02K 5/203; H02K 9/19
USPC .......................................................... 310/54
See application file for complete search history.

(56) References Cited

U.S. PATENT DOCUMENTS 6,909,210 B1 * 6/2005 Bostwick ............... H02K 5/203
310/58
2012/0161553 A1 * 6/2012 Kao ....................... H02K 5/203
310/54
2017/0047809 A1 2/2017 Sawada et al.
2022/0006349 A1 * 1/2022 Kang ....................... H02K 9/19

FOREIGN PATENT DOCUMENTS

CN 113078764 A * 7/2021 ............... H02K 5/20
CN 113489221 A * 10/2021 ............... H02K 9/19
JP 5717669 B2 5/2015
JP 6302736 B2 3/2018

OTHER PUBLICATIONS

English Translation of CN113489221A (Year: 2021).*
English Translation of CN113078764A (Year: 2021).*

* cited by examiner

*Primary Examiner* — Terrance L Kenerly
*Assistant Examiner* — Theodore L Perkins
(74) *Attorney, Agent, or Firm* — Rankin, Hill & Clark LLP

(57) ABSTRACT
A rotating electric machine casing includes a flow passage forming wall which spirally extends at a constant inclination angle, at least partially between an upstream end and a downstream end of a spiral passage. The spiral passage includes first and second widened regions. First and second rectifying partition walls extending along the spiral passage is formed in the first and second widened regions.

9 Claims, 4 Drawing Sheets

ROTATING ELECTRIC MACHINE

CROSS-REFERENCE TO RELATED APPLICATIONS

This application is based upon and claims the benefit of priority from Japanese Patent Application No. 2022-163835 filed on Oct. 12, 2022, the contents of which are incorporated herein by reference.

BACKGROUND OF THE INVENTION

Field of the Invention

The present invention relates to a rotating electric machine.

Description of the Related Art

For example, JP 5717669 B2 and JP 6302736 B2 disclose cooling structures for rotating electric machines. The water-cooled motor disclosed in JP 5717669 B2 includes a casing having a cooling passage. A spiral partition wall inclined at a constant angle forms the cooling passage. In the water-cooled motor disclosed in JP 6302736 B2, a cooling passage is formed of a horizontal passage and a partially inclined passage in order to spread the coolant from the vicinity of an inlet to the vicinity of an outlet.

SUMMARY OF THE INVENTION

In JP 5717669 B2, there is room for improvement in cooling performance because the coolant does not reach both ends of the casing (in the vicinity of the inlet and outlet). In JP 6302736 B2, since the intermediate portion of the cooling passage is largely bent in a crank shape, the refrigerant does not easily flow smoothly.

An object of the present invention is to solve the aforementioned problem.

A rotating electric machine according to an aspect of the present invention includes a casing configured to accommodate a rotor and a stator, the casing including a spiral passage through which a coolant in a form of liquid flows, wherein the casing includes a flow passage forming wall which spirally extends at a constant inclination angle, at least partially between an upstream end and a downstream end of the spiral passage, the spiral passage includes a widened region in which a flow passage width between parts of the flow passage forming wall that are adjacent to each other in an axial direction of the casing is larger than a flow passage width in another region of the spiral passage, the widened region is formed on at least one end side of the spiral passage in the axial direction, a rectifying partition wall extending along the spiral passage is formed in the widened region, and the widened region includes a branching portion configured to branch a flow of the coolant by an upstream end of the rectifying partition wall, and a merging portion configured to merge the coolant by a downstream end of the rectifying partition wall.

According to the rotating electric machine of the present invention, since the rectifying partition wall is provided in the widened region of the spiral passage, it is possible to suppress the occurrence of deviation in the flow of the coolant at the expanded portion of the flow passage and to distribute the coolant throughout the flow passage of the spiral passage. Thus, the cooling efficiency can be improved by causing the coolant to flow smoothly while expanding the cooling range.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a schematic diagram of a propeller device equipped with the drive unit.

DETAILED DESCRIPTION OF THE INVENTION

Figure 1:
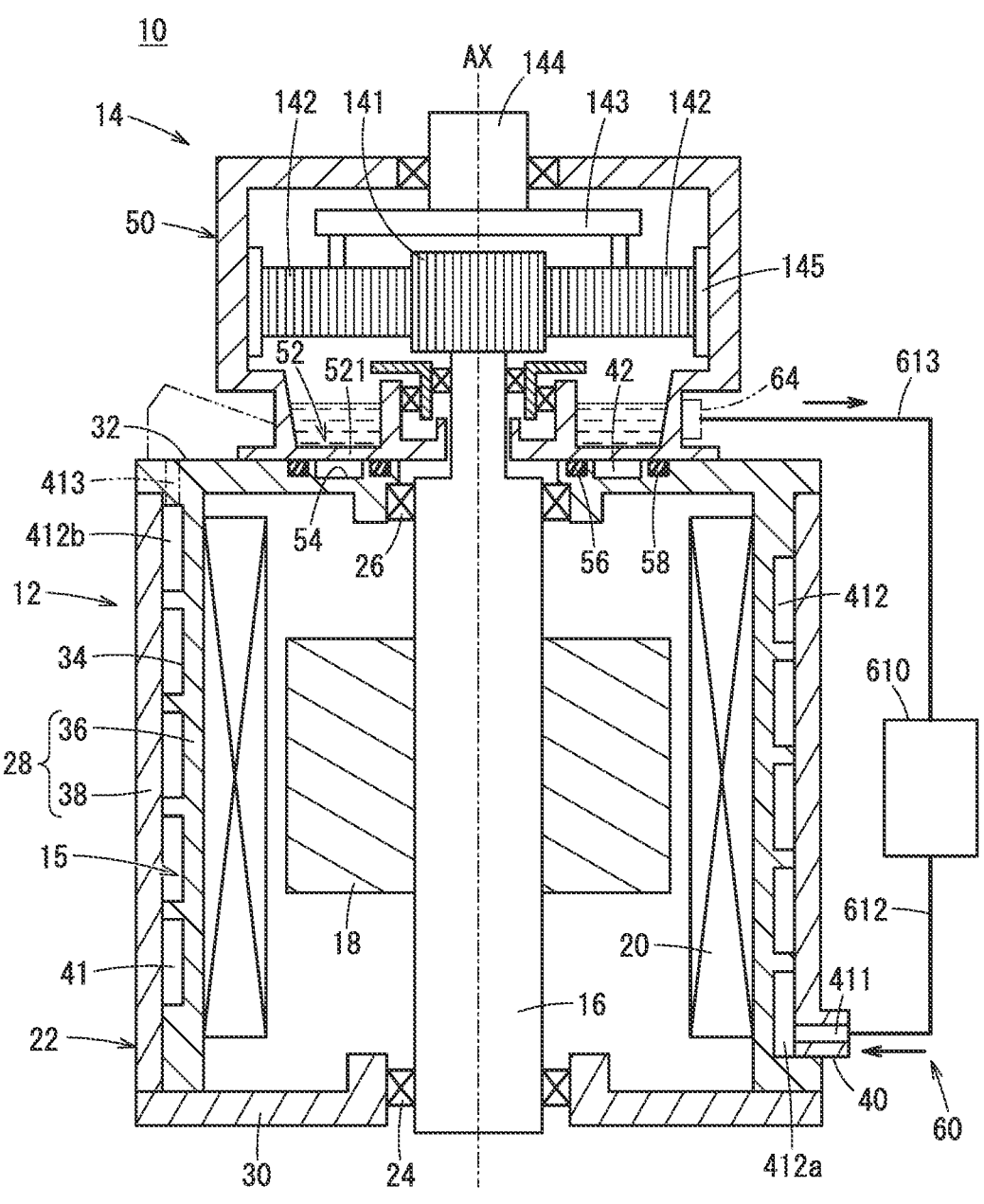
FIG. 1 is an overall schematic view of a drive unit provided with a rotating electric machine according to an embodiment of the present invention.

A drive unit 10 shown in FIG. 1 includes a rotating electric machine 12, a transmission 14 integrated with the rotating electric machine 12, and a cooling structure 15 for cooling the rotating electric machine 12 and the transmission 14. The drive unit 10 is used in a state in which a rotation axis AX (hereinafter simply referred to as "axis AX") of the rotating electric machine 12 is directed in the vertical direction. The term "vertical direction" includes not only an exact vertical direction but also a direction slightly inclined with respect to the vertical direction. Although the use of the drive unit 10 is not particularly limited, it can be used as a power source for driving a propeller 106 of a vertical take-off and landing aircraft, for example (see FIG. 4).

The rotating electric machine 12 is an electric motor. The rotating electric machine 12 includes a shaft 16 that is rotatably supported, a rotor 18 fixed to the shaft 16, a stator 20 surrounding the rotor 18, and a rotating electric machine casing 22 accommodating the shaft 16, the rotor 18, and the stator 20. Hereinafter, the term "axial direction" means an axial direction of the rotating electric machine 12, the shaft 16, the rotor 18, the stator 20 or the rotating electric machine casing 22.

The rotor 18 is disposed on an axis AX of the rotating electric machine 12. Although not shown in detail, the rotor 18 includes a rotor core made of laminated steel plates, for example, and magnets fixed to the rotor core. The shaft 16 and the rotor 18 rotate integrally. The rotor 18 is rotatably supported by bearings 24 and 26 disposed at one end and another end of the rotating electric machine casing 22, respectively.

The stator 20 is formed in a hollow cylindrical shape, and is fixed to the inner circumferential surface of the rotating electric machine casing 22. Although not shown in detail, the stator 20 includes a stator core and coils retained by the stator core. Electric power is supplied from a battery (not shown) to the stator 20, a current flows through the coils, and a magnetic field is generated, whereby the rotor 18 and the shaft 16 are rotationally driven.

The rotating electric machine casing 22 has a cylindrical circumferential wall portion 28 surrounding the stator 20, a ceiling portion 32 constituting one end portion (upper end portion) of the rotating electric machine casing 22, and a bottom wall portion 30 constituting another end portion (lower end portion) of the rotating electric machine casing 22. The circumferential wall portion 28 has a circumferential wall body 36 in which a spiral groove 34 is formed on an outer circumferential surface thereof, and a cylindrical cover 38 surrounding the circumferential wall body 36.

The rotating electric machine 12 is provided with a first cooling passage 41 of the cooling structure 15. The first cooling passage 41 cools the rotating electric machine 12. A liquid coolant (for example, water or antifreeze liquid) is supplied to the first cooling passage 41.

The first cooling passage 41 has an inlet passage 411, a spiral passage 412, and a discharge passage 413. The inlet passage 411 introduces the coolant into the rotating electric machine casing 22. The inlet passage 411 communicates with an upstream end 412a of the spiral passage 412. The inlet passage 411 is a tangential hole passing through the outer circumferential portion of the rotating electric machine casing 22 in a tangential direction (see FIG. 2). The inlet passage 411 may be an axial hole that passes through the bottom wall portion 30 of the rotating electric machine casing 22 in the axial direction.

The inlet passage 411 is provided in a lower portion of the rotating electric machine casing 22 in a use state in which the axis AX of the rotating electric machine 12 is directed in the vertical direction. In the present embodiment, the inlet passage 411 is formed in an inlet port 40 provided in the lower portion of the cylindrical cover 38. A supply line 612 of a coolant circulation device 60 is connected to the inlet port 40.

In the present embodiment, the spiral passage 412 is formed between the circumferential wall body 36 and the cylindrical cover 38. The lower end of the spiral passage 412 is the upstream end 412a of the spiral passage 412. The upper end of the spiral passage 412 is a downstream end 412b of the spiral passage 412.

Figure 2:
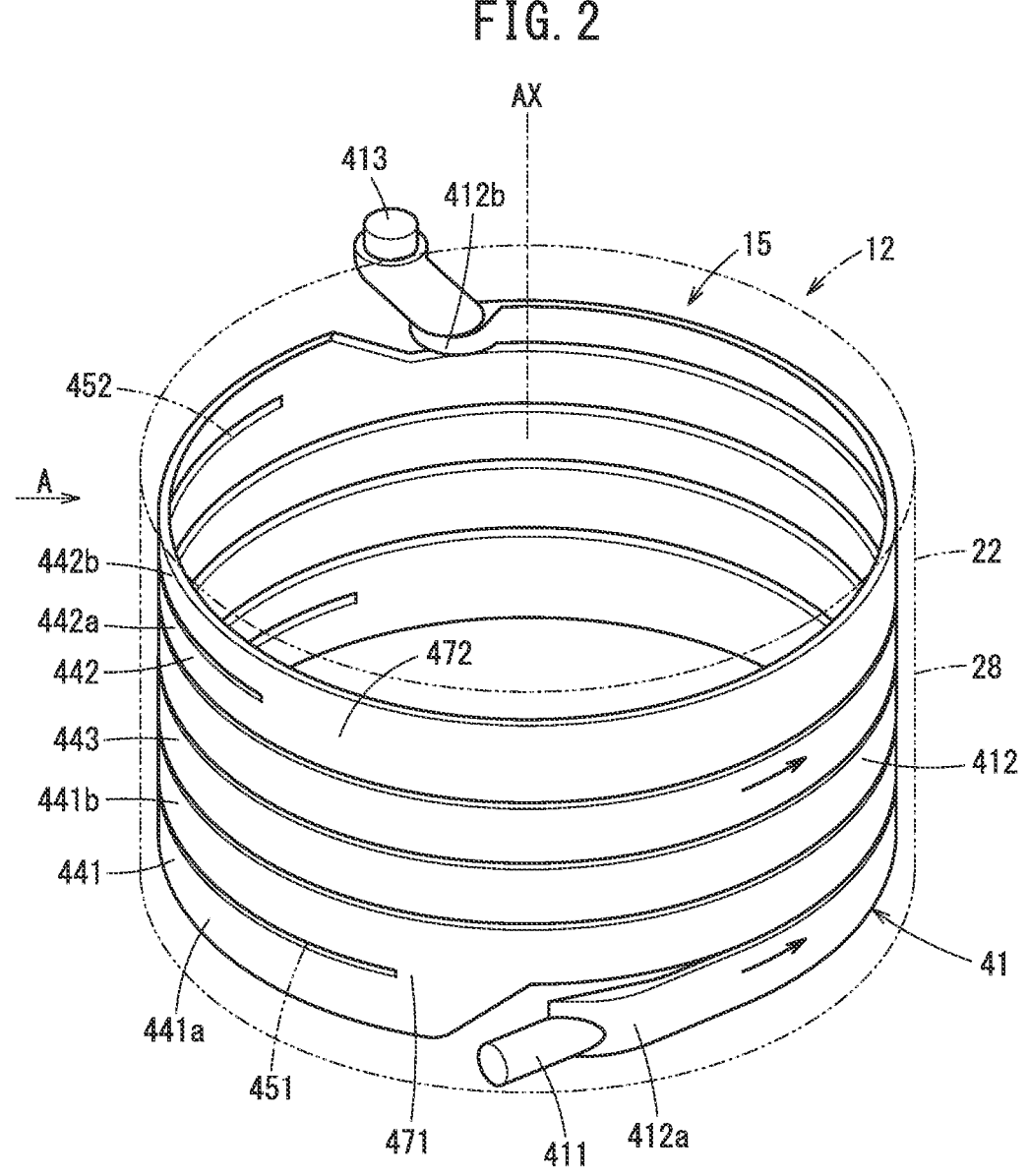
FIG. 2 is a perspective view showing the flow passage shape of a first cooling passage including a spiral passage.

As shown in FIG. 2, the spiral passage 412 extends spirally in the circumferential wall portion 28 of the rotating electric machine casing 22 on the downstream side of the inlet passage 411, with the axis AX of the rotating electric machine 12 as the center.

Figure 3:
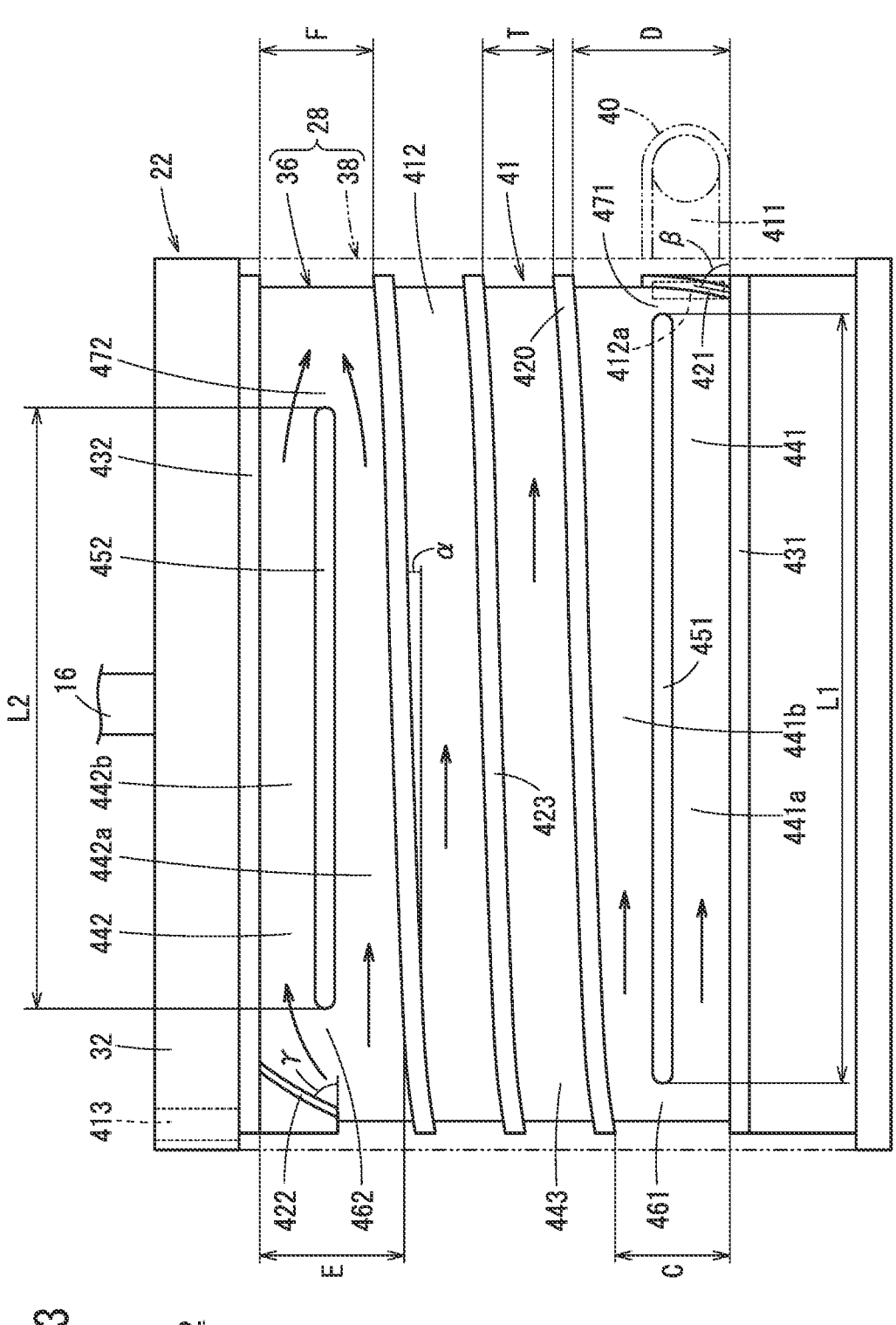
FIG. 3 is a side view of a rotating electric machine casing as seen through a cylindrical cover (side view as seen from the direction of arrow A in FIG. 2)

As shown in FIG. 3, the rotating electric machine casing 22 has a flow passage forming wall 420 which spirally extends at a constant inclination angle, at least partially between the upstream end 412a and the downstream end 412b of the spiral passage 412. The spiral passage 412 has widened regions (a first widened region 441 and a second widened region 442) in which a flow passage width between parts of the flow passage forming wall 420 that are adjacent to each other in the axial direction of the rotating electric machine casing 22 is larger than a flow passage width in other regions thereof. The widened region is formed on at least one end side of the spiral passage 412 in the axial direction. Rectifying partition walls (first rectifying partition wall 451 and second rectifying partition wall 452) extending along the spiral passage 412 are formed in the widened region. The rectifying partition wall is separated from the flow passage forming wall 420.

The flow passage forming wall 420 has a first end forming wall 431 which forms one end portion of the spiral passage 412 in the axial direction and a second end forming wall 432 which forms another end portion of the spiral passage 412 in the axial direction. The first end forming wall 431 and the second end forming wall 432 extend in parallel with the circumferential direction of the rotating electric machine casing 22.

In the present embodiment, the spiral passage 412 has the first widened region 441 provided on one end side of the spiral passage 412 in the axial direction and the second widened region 442 provided on the other end side of the spiral passage 412 in the axial direction. The spiral passage 412 has an intermediate region 443 extending helically between the first widened region 441 and the second widened region 442. The first rectifying partition wall 451 is arranged in the first widened region 441, and the second rectifying partition wall 452 is arranged in the second widened region 442.

The flow passage width of the first widened region 441 and the second widened region 442 is larger than a flow passage width T of the intermediate region 443. Specifically, the flow passage width T of the intermediate region 443 is a normal width of the spiral passage 412. A flow passage width C at the upstream end and a flow passage width D at the downstream end of the first widened region 441 are larger than the flow passage width T of the intermediate region 443. A flow passage width E at the upstream end and the flow passage width F at the downstream end of the second widened region 442 are larger than the flow passage width T of the intermediate region 443. The flow passage width of the first widened region 441 is a distance in the axial direction between the parts of the flow passage forming wall 420 that are adjacent to each other in the axial direction in the first widened region 441. The flow passage width of the second widened region 442 is a distance in the axial direction between the parts of the flow passage forming wall 420 that are adjacent to each other in the axial direction in the second widened region 442. The flow passage width of the intermediate region 443 is a distance in the axial direction between the parts of the flow passage forming wall 420 that are adjacent to each other in the axial direction in the intermediate region 443. The parts of the flow passage forming wall 420 that are adjacent in the axial direction in the intermediate region 443 are parallel to each other. Therefore, the flow passage width of the intermediate region 443 is constant in the extending direction of the intermediate region 443.

The first widened region 441 is disposed at a position neighboring the upstream end 412a of the spiral passage 412 in the circumferential direction of the rotating electric machine casing 22. The first widened region 441 is formed in a region of the spiral passage 412 where the parts of the flow passage forming wall 420 that are adjacent to each other have different inclination angles. The first rectifying partition wall 451 is arranged between the one part and the other adjacent part of the flow passage forming wall 420 having different inclination angles from each other.

The first widened region 441 has a first branching portion 461 for branching the flow of the coolant by the upstream end of the first rectifying partition wall 451, and a first merging portion 471 for merging the coolant by the downstream end of the first rectifying partition wall 451. The first merging portion 471 is the downstream end of the first widened region 441, and the flow passage width of the spiral passage 412 is reduced at the location of the first merging portion 471. The flow passage forming wall 420 has a first inclined portion 421 which is inclined at the location of the first merging portion 471 so as to reduce the flow passage width of the spiral passage 412. An inclination angle β of the first inclined portion 421 with respect to the circumferential direction of the rotating electric machine casing 22 is larger than an inclination angle α of a portion of the flow passage forming wall 420 forming the intermediate region 443 (intermediate forming wall 423).

The first widened region 441 is divided into two sub-flow passages 441a and 441b in the axial direction by the first rectifying partition wall 451. One side of one sub-flow passage 441a in the flow passage width direction is formed by the first end forming wall 431. As shown in FIG. 2, the sub-flow passage 441a and the upstream end 412a of the spiral passage 412 are disposed on the same circumference around the axis AX. The downstream side of the first rectifying partition wall 451 extends toward the upstream end 412a of the spiral passage 412.

As shown in FIG. 3, the first rectifying partition wall 451 extends in parallel with the first end forming wall 431. The first rectifying partition wall 451 may be inclined with respect to the first end forming wall 431. The first rectifying partition wall 451 is formed to have a length shorter than half of the circumference of the rotating electric machine casing 22. The first rectifying partition wall 451 may be formed to have a length equal to or longer than the half circumference of the rotating electric machine casing 22.

The second widened region 442 is disposed at a position neighboring the downstream end 412b of the spiral passage 412 in the circumferential direction of the rotating electric machine casing 22. The second widened region 442 is formed in a region of the spiral passage 412 where the parts of the flow passage forming wall 420 that are adjacent to each other have different inclination angles. The second rectifying partition wall 452 is arranged between the one part and the other adjacent part of the flow passage forming wall 420 having different inclination angles from each other.

The second widened region 442 has a second branching portion 462 for branching the flow of the coolant by the upstream end of the second rectifying partition wall 452, and a second merging portion 472 for merging the coolant by the downstream end of the second rectifying partition wall 452. The second branching portion 462 is the upstream end of the second widened region 442, and the flow passage width of the spiral passage 412 is enlarged at the location of the second branching portion 462. The flow passage forming wall 420 has a second inclined portion 422 which is inclined at the location of the second branching portion 462 so as to enlarge the flow passage width of the spiral passage 412. An inclination angle γ of the second inclined portion 422 with respect to the circumferential direction of the rotating electric machine casing 22 is larger than the inclination angle α of the intermediate forming wall 423.

The second widened region 442 is divided into two sub-flow passages 442a and 442b in the axial direction by the second rectifying partition wall 452. One side of the one sub-flow passage 442b in the flow passage width direction is formed by the second end forming wall 432. As shown in FIG. 2, the sub-flow passage 442b and the downstream end 412b of the spiral passage 412 are disposed on the same circumference around the axis AX. The upstream side of the second rectifying partition wall 452 extends toward the downstream end 412b of the spiral passage 412.

As shown in FIG. 3, the second rectifying partition wall 452 extends in parallel with the second end forming wall 432. The second rectifying partition wall 452 may be inclined with respect to the second end forming wall 432. The second rectifying partition wall 452 is formed to have a length shorter than half of the circumference of the rotating electric machine casing 22. An extension length L2 of the second rectifying partition wall 452 is shorter than an extension length L1 of the first rectifying partition wall 451. The extension length L2 of the second rectifying partition wall 452 may be equal to the extension length L1 of the first rectifying partition wall 451 or may be longer than the extension length L1 of the first rectifying partition wall 451. The second rectifying partition wall 452 may be formed to have a length equal to or longer than the half circumference of the rotating electric machine casing 22. That is, the configurations (length, wall thickness, etc.) of the first rectifying partition wall 451 and the second rectifying partition wall 452 can be appropriately changed, and the flow of the coolant can be adjusted by changing the flow passage cross-sectional areas in the first widened region 441 and the second widened region 442, respectively.

The discharge passage 413 communicates with the downstream end 412b of the spiral passage 412. The discharge passage 413 discharges the coolant that has passed through the spiral passage 412 from the rotating electric machine casing 22. The discharge passage 413 is an axial hole passing through an end wall portion (ceiling portion 32) constituting one end portion of the rotating electric machine casing 22 in a use state in the axial direction of the rotating electric machine 12. The discharge passage 413 may be a tangential hole that passes through the outer circumferential portion of the rotating electric machine casing 22 in the tangential direction.

As shown in FIG. 1, the transmission 14 is fixed to one end portion (ceiling portion 32) of the rotating electric machine 12. In the present embodiment, the transmission 14 is configured as a planetary gear unit. In the present embodiment, the transmission 14 is disposed coaxially with the rotating electric machine 12. The transmission 14 includes a sun gear 141 fixed to one end (upper end) of the shaft 16 of the rotating electric machine 12, and a plurality of planetary gears 142 meshing with the sun gear 141.

The transmission 14 further includes a carrier 143 for supporting the plurality of planetary gears 142, an output shaft 144 fixed to the carrier 143, and an internal gear 145 meshing with the plurality of planetary gears 142. The output shaft 144 is disposed coaxially with the shaft 16. A load (for example, the propeller 106 shown in FIG. 4) is coupled to the output shaft 144. The transmission 14 further includes a transmission casing 50 which accommodates the sun gear 141, the planetary gears 142, the carrier 143, the output shaft 144 and the internal gear 145. The internal gear 145 is formed on an inner circumferential surface of the transmission casing 50. The configuration of the transmission 14 is not limited to the planetary gear unit, and other transmission mechanisms may be used.

Lubricating oil circulates inside the transmission 14. The transmission 14 has an oil reservoir portion 52 for storing the lubricating oil. The oil reservoir portion 52 is provided in a lower portion of the transmission casing 50. The oil reservoir portion 52 is formed in an annular shape centered about the axis AX of the rotating electric machine 12. Although details are not shown, a lubricating oil circulation mechanism is provided inside the transmission casing 50 to recover lubricating oil from the oil reservoir portion 52 and to inject (spray) the lubricating oil from above a gear train (sun gear 141, planetary gears 142 and internal gear 145). A pump for recovering the lubricating oil from the oil reservoir portion 52 may be, for example, a cam-type pump mechanically interlocked with the rotation of the shaft 16.

The cooling structure 15 further includes a second cooling passage 42 for cooling the transmission 14. The first cooling passage 41 and the second cooling passage 42 communicate with each other, and a common coolant flows through the first cooling passage 41 and the second cooling passage 42. The transmission casing 50 has a communication passage (not shown) for connecting the first cooling passage 41 and the second cooling passage 42. The first cooling passage 41 and the second cooling passage 42 are arranged in series. In the present embodiment, the first cooling passage 41 is disposed upstream of the second cooling passage 42. Specifically, the second cooling passage 42 is formed by a gap provided between the rotating electric machine casing 22 and the transmission casing 50.

The second cooling passage 42 is formed so as to surround the axis AX of the rotating electric machine 12. The second cooling passage 42 is formed along the oil reservoir portion 52. A groove 54 surrounding the axis AX is formed in an upper surface of the ceiling section 32 of the rotating electric machine casing 22. The groove 54 and a lower surface of the transmission casing 50 form the second cooling passage 42. The lower surface of a bottom wall 521 of the oil reservoir portion 52 is a part of the lower surface of the transmission casing 50. Therefore, the second cooling passage 42 is formed by the lower surface of the bottom wall 521 of the oil reservoir portion 52 and the groove 54. The transmission casing 50 further includes an outlet passage (not shown) for discharging the coolant that has passed through the second cooling passage 42 from the transmission casing 50. The outlet passage opens at an outlet port 64 provided in the transmission casing 50.

The drive unit 10 further includes an inner seal member 56 and an outer seal member 58 disposed between the rotating electric machine 12 and the transmission 14. The inner seal member 56 is disposed between the rotating electric machine 12 and the transmission 14, and inside the second cooling passage 42 extending in an arc shape (C-shape). The outer seal member 58 is disposed between the rotating electric machine 12 and the transmission 14, and outside the second cooling passage 42. The inner seal member 56 and the outer seal member 58 are sandwiched and held between the rotating electric machine casing 22 and the transmission casing 50. The inner seal member 56 and the outer seal member 58 are disposed concentrically with respect to the axis AX.

A recovery line 613 of the coolant circulation device 60 is connected to the outlet port 64. The coolant is introduced into a supply unit 610 of the coolant circulation device 60 via the recovery line 613. Although not shown in detail, the supply unit 610 includes, for example, a heat exchanger for cooling the coolant and a pump for supplying the coolant to the first cooling passage 41 of the cooling structure 15. It should be noted that any type of pump such as a mechanical drive type or an electric drive type can be employed.

The supply unit 610 of the coolant circulation device 60 supplies the coolant to the first cooling passage 41 through the supply line 612. The coolant is discharged from the rotating electric machine casing 22 after sequentially flowing through the inlet passage 411, the spiral passage 412, and the discharge passage 413 of the first cooling passage 41. While the coolant flows through the spiral passage 412, the rotating electric machine casing 22 is cooled by the coolant.

Specifically, as shown in FIG. 3, the coolant is introduced into the spiral passage 412 via the inlet passage 411. The coolant is divided into the sub-flow passages 441*a* and 441*b* at the first branching portion 461 of the first widened region 441. The separated coolant is merged at the first merging portion 471 and flows to the intermediate region 443. The coolant flows through the intermediate region 443 to the second widened region 442. The coolant is divided into the sub-flow passages 442*a* and 442*b* at the second branching portion 462 of the second widened region 442. The separated coolant is merged at the second merging portion 472 and flows to the discharge passage 413.

In FIG. 1, the coolant flows from the discharge passage 413 of the first cooling passage 41 to the second cooling passage 42 through the communication passage (not shown). When the coolant flows through the second cooling passage 42, the transmission casing 50 is cooled by the coolant. The coolant is discharged from the second cooling passage 42 through the outlet port 64 to the outside of the transmission casing 50. The coolant discharged from the transmission casing 50 is returned to the supply unit 610 via the recovery line 613 of the coolant circulation device 60.

Figure 4:
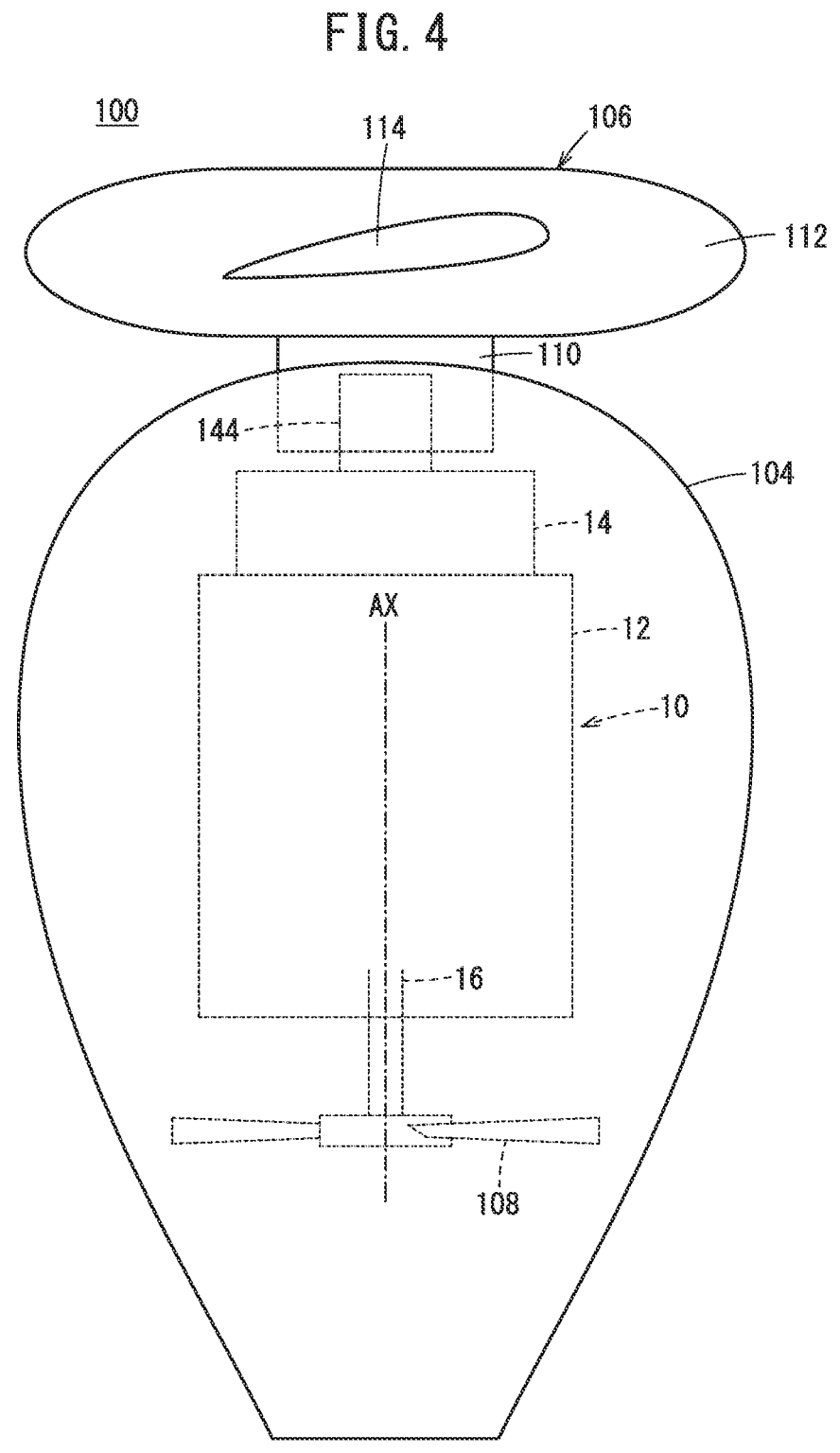

As shown in FIG. 4, the drive unit 10 can be applied to a propeller device 100. The drive unit 10 is not limited to a power source for the propeller device 100, but can be used as a power source for other devices. The propeller device 100 is provided with the drive unit 10, an accommodation member 104 for accommodating the drive unit 10, and the propeller 106 connected to the transmission 14 of the drive unit 10.

The propeller device 100 is used for a vertical take-off and landing aircraft, for example. Therefore, the rotating electric machine 12 is disposed such that the axis AX of the rotating electric machine 12 is directed in the vertical direction when the propeller device 100 is in use. The propeller device 100 may adopt a configuration in which the axis AX of the rotating electric machine 12 is directed substantially in the horizontal direction when the propeller device 100 is in use.

A fan 108 is attached to the lower end of the shaft 16 of the rotating electric machine 12 for generating air flow in the accommodation member 104, and blows air, for example, a heat exchanger (not shown) of the supply unit 610. The propeller 106 has a propeller shaft 110 connected to the output shaft 144 of the transmission 14, a hub 112 provided in an upper end of the propeller shaft 110, and a plurality of blades 114 projecting radially outward from the hub 112. It should be noted that the present invention can be applied to an aircraft, a ship, a vehicle such as a two-wheeled or four-wheeled vehicle, or the like by arranging the rotation axis of the output shaft 144 of the transmission 14 of the drive unit 10 to be directed in the horizontal direction.

According to the present embodiment, the following effects are obtained.

As shown in FIG. 3, since the first rectifying partition wall 451 is provided in the first widened region 441 of the spiral passage 412 and the second rectifying partition wall 452 is provided in the second widened region 442, it is possible to suppress the occurrence of deviation in the flow of the coolant at the expanded portion of the flow passage and to distribute the coolant throughout the flow passage of the spiral passage 412. Thus, the cooling efficiency can be improved by causing the coolant to flow smoothly while expanding the cooling range.

The first widened region 441 and the second widened region 442 are formed in the regions of the spiral passage 412 in which the parts of the flow passage forming wall 420 that are adjacent have different inclination angles from each other, and the first rectifying partition wall 451 and the second rectifying partition wall 452 are arranged between the parts of the flow passage forming wall 420 having the different inclination angles from each other. The first rectifying partition wall 451 and the second rectifying partition wall 452 disperse the deviated flow caused by the increase in the flow passage width, whereby the area to be cooled can be increased.

The first widened region 441 and the second widened region 442 are provided at positions neighboring the upstream end 412*a* and the downstream end 412*b* of the spiral passage 412 in the circumferential direction of the rotating electric machine casing 22. The first end forming wall 431 and the second end forming wall 432 extend in parallel with the circumferential direction of the rotating electric machine casing 22, and the first rectifying partition wall 451 and the second rectifying partition wall 452 extend toward the upstream end 412*a* and the downstream end 412*b* of the spiral passage 412, respectively. As seen in the prior art, in order to avoid the upstream end 412*a* and of the downstream end 412*b* of the spiral passage 412, when the flow passage is not provided in the vicinity of the upstream end 412*a* and the downstream end 412*b*, the cooling range tends to be limited. On the other hand, in the present embodiment, by disposing the flow passages also in the vicinity of the upstream end 412*a* and the downstream end 412*b*, the area to be cooled can be expanded.

The first rectifying partition wall 451 and the second rectifying partition wall 452 extend in parallel with the first end forming wall 431 and the second end forming wall 432, respectively. By ensuring a constant distance between the first rectifying partition wall 451 and the first end forming wall 431 and a constant distance between the second rectifying partition wall 452 and the second end forming wall 432, the changes in the flow rate of the coolant can be suppressed and it is possible to cool efficiently.

The first rectifying partition wall 451 and the second rectifying partition wall 452 are formed to have lengths shorter than half of a circumference of the rotating electric machine casing 22. The contact area between the coolant and the first rectifying partition wall 451 is made as small as possible, and the contact area between the coolant and the second rectifying partition wall 452 is made as small as possible, so that frictional resistance at the first rectifying partition wall 451 and the second rectifying partition wall 452 can be suppressed. Thus, an increase in pressure loss due to the first rectifying partition wall 451 and the second rectifying partition wall 452 can be suppressed.

The spiral passage 412 includes the first widened region 441 provided on one end side of the spiral passage 412 in the axial direction and the second widened region 442 provided on another end side of the spiral passage 412 in the axial direction. The first rectifying partition wall 451 is arranged in the first widened region 441 and the second rectifying partition wall 452 is arranged in the second widened region 442. By expanding the cooling range on each side of the upstream end 412*a* and the downstream end 412*b* of the spiral passage 412, the cooling efficiency can be further improved.

One of the inlet passage 411 or the discharge passage 413 is the tangential hole passing through the outer circumferential portion of the rotating electric machine casing 22 in the tangential direction, and the other of the inlet passage 411 or the discharge passage 413 is the axial hole passing through one end portion of the rotating electric machine casing 22 in the axial direction. The extension length of the second rectifying partition wall 452 is shorter than the extension length of the first rectifying partition wall 451. By making the extension length of the second rectifying partition wall 452 shorter than the extension length of the first rectifying partition wall 451, it is possible to appropriately ensure the flow passage width in the second widened region 442 in which the length in the circumferential direction tends to be shortened. Thus, the coolant flows smoothly and the cooling efficiency can be improved.

The above-described embodiments are summarized as follows.

The embodiment described above discloses the rotating electric machine (12) including the casing (22) configured to accommodate the rotor (18) and the stator (20), the casing including the spiral passage (412) through which the coolant in the form of liquid flows, wherein the casing includes the flow passage forming wall (420) which spirally extends at the constant inclination angle, at least partially between the upstream end (412*a*) and the downstream end (412*b*) of the spiral passage, the spiral passage includes the widened region (441, 442) in which the flow passage width between the parts of the flow passage forming wall that are adjacent to each other in the axial direction of the casing is larger than the flow passage width in the other region of the spiral passage, the widened region is formed on at least one end side of the spiral passage in the axial direction, the rectifying partition wall (451, 452) extending along the spiral passage is formed in the widened region, and the widened region includes the branching portion (461, 462) configured to branch the flow of the coolant by the upstream end of the rectifying partition wall, and the merging portion (471, 472) configured to merge the coolant by the downstream end of the rectifying partition wall.

Since the rectifying partition wall is provided in the widened region of the spiral passage, it is possible to suppress the occurrence of deviation in the flow of the coolant at the expanded portion of the flow passage and to distribute the coolant throughout the flow passage of the spiral passage. Thus, the cooling efficiency can be improved by causing the coolant to flow smoothly while expanding the cooling range.

The widened region may be formed in the region of the spiral passage in which the parts of the flow passage forming wall that are adjacent have different inclination angles from each other, and the rectifying partition wall may be arranged between the parts of the flow passage forming wall having the different inclination angles from each other.

The rectifying partition wall disperses the deviated flow of coolant caused by the increase in the flow passage width, whereby the area to be cooled can be increased.

The widened region may be provided at the position neighboring the upstream end or the downstream end of the spiral passage in the circumferential direction of the casing, the flow passage forming wall may include the end forming wall (431, 432) which forms at least one end portion of the spiral passage in the axial direction, and the end forming wall may extend in parallel with the circumferential direction, and the rectifying partition wall may extend toward the upstream end or the downstream end of the spiral passage.

In order to avoid the upstream end or the downstream end of the spiral passage, when the flow passage is not provided in the vicinity of the upstream end or the downstream end, the cooling range tends to be limited. On the other hand, by disposing the flow passage also in the vicinity of the upstream end or the downstream end, the area to be cooled can be expanded.

The rectifying partition wall may extend in parallel with the end forming wall.

By ensuring a constant distance between the rectifying partition wall and the end forming wall, the changes in the flow rate of the coolant can be suppressed and it is possible to cool efficiently.

The rectifying partition wall may be formed to have a length shorter than half of a circumference of the casing.

The contact area between the coolant and the rectifying partition wall is made as small as possible, so that frictional resistance at the rectifying partition wall can be suppressed. Thus, an increase in pressure loss due to the rectifying partition wall can be suppressed.

The widened region may include the first widened region (441) provided on one end side of the spiral passage in the axial direction and the second widened region (442) provided on the other end side of the spiral passage in the axial direction, and the rectifying partition wall may include the first rectifying partition wall (451) arranged in the first widened region and the second rectifying partition wall (452) arranged in the second widened region.

By expanding the cooling range on each side of the upstream end and the downstream end, the cooling efficiency can be further improved.

The casing may include the inlet passage (411) connected to the upstream end of the spiral passage, and the discharge passage (413) connected to the downstream end of the spiral passage, one of the inlet passage or the discharge passage may be the tangential hole passing through the outer circumferential portion of the casing in the tangential direction, the other of the inlet passage or the discharge passage may be the axial hole passing through one end portion of the casing in the axial direction of the casing, the first widened region may be provided at the position neighboring the upstream end or the downstream end of the spiral passage, which is connected to the tangential hole, the second widened region may be provided at the position neighboring the upstream end or the downstream end of the spiral passage, which is connected to the axial hole, and the extension length of the second rectifying partition wall is shorter than the extension length of the first rectifying partition wall.

The length of the second widened region provided at the position neighboring the upstream end or the downstream end of the spiral passage, which is connected to the axial hole, tends to be short in the circumferential direction than the length of the first widened region provided at the position neighboring the tangential hole. By making the extension length of the second rectifying partition wall shorter than the extension length of the first rectifying partition wall, it is possible to appropriately ensure the flow passage width in the second widened region. Thus, the coolant flows smoothly and the cooling efficiency can be improved.

Moreover, it should be noted that the present invention is not limited to the disclosure described above, and various configurations may be adopted therein without departing from the essence and gist of the present invention.

The invention claimed is:

1. A rotating electric machine comprising a casing configured to accommodate a rotor and a stator, the casing including a spiral passage through which a coolant in a form of liquid flows,
   wherein the casing includes a flow passage forming wall which spirally extends at a constant inclination angle, at least partially between an upstream end and a downstream end of the spiral passage,
   the spiral passage includes a widened region in which a flow passage width between parts of the flow passage forming wall that are adjacent to each other in an axial direction of the casing is larger than a flow passage width in another region of the spiral passage, the another region being adjacent to the widened region in a circumferential direction,
   the widened region is formed on at least one end side of the spiral passage in the axial direction,
   a rectifying partition wall extending along the spiral passage is formed in the widened region, and
   the widened region includes a branching portion configured to branch a flow of the coolant by an upstream end of the rectifying partition wall, and a merging portion configured to merge the coolant by a downstream end of the rectifying partition wall,
   the widened region is divided into two sub-flow passages in the axial direction by the rectifying partition wall,
   the branching portion is located at an upstream end of the widened region and is adjacent to upstream ends of the two sub-flow passages, and
   the merging portion is located at a downstream end of the widened region and is adjacent to downstream ends of the two sub-flow passages.

2. The rotating electric machine according to claim 1, wherein the widened region is formed in a region of the spiral passage in which the parts of the flow passage forming wall that are adjacent have different inclination angles from each other, and
   the rectifying partition wall is arranged between the parts of the flow passage forming wall having the different inclination angles from each other.

3. The rotating electric machine according to claim 1, wherein the widened region is provided at a position neighboring the upstream end or the downstream end of the spiral passage in the circumferential direction of the casing,
   the flow passage forming wall includes an end forming wall which forms at least one end portion of the spiral passage in the axial direction, and
   the end forming wall extends in parallel with the circumferential direction, and the rectifying partition wall extends toward the upstream end or the downstream end of the spiral passage.

4. The rotating electric machine according to claim 3, wherein the rectifying partition wall extends in parallel with the end forming wall.

5. The rotating electric machine according to claim 4, wherein the rectifying partition wall is formed to have a length shorter than half of a circumference of the casing.

6. The rotating electric machine according to claim 1, wherein the widened region includes a first widened region provided on the one end side of the spiral passage in the axial direction and a second widened region provided on another end side of the spiral passage in the axial direction, and
   the rectifying partition wall includes a first rectifying partition wall arranged in the first widened region, and a second rectifying partition wall arranged in the second widened region.

7. The rotating electric machine according to claim 6, wherein the casing includes an inlet passage connected to the upstream end of the spiral passage, and a discharge passage connected to the downstream end of the spiral passage,
   one of the inlet passage or the discharge passage is a tangential hole passing through an outer circumferential portion of the casing in a tangential direction,
   another of the inlet passage or the discharge passage is an axial hole passing through one end portion of the casing in the axial direction of the casing,
   the first widened region is provided at a position neighboring the upstream end or the downstream end of the spiral passage, which is connected to the tangential hole,
   the second widened region is provided at a position neighboring the upstream end or the downstream end of the spiral passage, which is connected to the axial hole, and
   an extension length of the second rectifying partition wall is shorter than an extension length of the first rectifying partition wall.

8. The rotating electric machine according to claim 1, wherein the widened region includes a first widened region provided on one end side of the spiral passage in the axial direction, and a second widened region provided on another end side of the spiral passage in the axial direction, the rectifying partition wall includes a first rectifying partition wall arranged in the first widened region, and a second rectifying partition wall arranged in the second widened region, the spiral passage includes an intermediate region extending helically between the first widened region and the second widened region, and a flow passage width of each of the first widened region and the second widened region is larger than a flow passage width of the intermediate region.

9. The rotating electric machine according to claim 1, wherein the merging portion is a downstream end of the widened region, and at the merging portion, a flow passage width of the spiral passage is reduced, and the widened region is provided at a position neighboring the upstream end and the downstream end of the spiral passage in the circumferential direction of the casing.

* * * * *